(12) United States Patent
Wang et al.

(10) Patent No.: US 8,270,908 B2
(45) Date of Patent: Sep. 18, 2012

(54) POWER CONTROL AND CHANNEL REUSE TECHNIQUES FOR WIRELESS RELAY NETWORKS

(75) Inventors: Shu-Shaw Wang, Arlington, TX (US); Tony Reid, Plano, TX (US); Marilynn Green, Plano, TX (US)

(73) Assignee: Nokia Corporation, Espoo (FI)

( * ) Notice: Subject to any disclaimer, the term of this patent is extended or adjusted under 35 U.S.C. 154(b) by 1239 days.

(21) Appl. No.: 11/969,192

(22) Filed: Jan. 3, 2008

(65) Prior Publication Data
US 2008/0214182 A1 Sep. 4, 2008

Related U.S. Application Data

(60) Provisional application No. 60/884,016, filed on Jan. 8, 2007.

(51) Int. Cl.
*H04B 1/00* (2006.01)
(52) U.S. Cl. ....... 455/69; 455/67.11; 455/522; 455/423; 455/434; 455/41.2; 370/329; 370/338
(58) Field of Classification Search .................. 455/423, 455/67.11, 522, 69, 11.1, 450, 447
See application file for complete search history.

(56) References Cited

U.S. PATENT DOCUMENTS

| | | | | |
|---|---|---|---|---|
| 5,850,605 A * | 12/1998 | Souissi et al. | ... | 455/437 |
| 6,519,278 B1 * | 2/2003 | Hiramatsu | ... | 375/140 |
| 6,823,195 B1 * | 11/2004 | Boesen | ... | 455/522 |
| 6,904,282 B2 * | 6/2005 | Cooper | ... | 455/434 |
| 6,950,670 B2 * | 9/2005 | Chang et al. | ... | 455/522 |
| 7,236,474 B2 * | 6/2007 | Seo et al. | ... | 370/329 |
| 7,515,558 B2 * | 4/2009 | Miyamoto et al. | ... | 370/320 |
| 7,519,029 B2 * | 4/2009 | Takeda et al. | ... | 370/335 |
| 7,613,458 B2 * | 11/2009 | Roberts | ... | 455/445 |
| 7,756,041 B2 * | 7/2010 | Whitehill et al. | ... | 370/238 |
| 8,019,288 B2 * | 9/2011 | Yu et al. | ... | 455/69 |
| 8,073,480 B2 * | 12/2011 | Furukawa et al. | ... | 455/522 |
| 8,165,073 B2 * | 4/2012 | Wang et al. | ... | 370/329 |
| 2004/0266339 A1 | 12/2004 | Larsson | | |
| 2007/0149118 A1 * | 6/2007 | Kang et al. | ... | 455/11.1 |
| 2007/0160014 A1 * | 7/2007 | Larsson | ... | 370/338 |

(Continued)

FOREIGN PATENT DOCUMENTS

EP 1947782 A1 7/2008

(Continued)

OTHER PUBLICATIONS

International Search Report and Written Opinion for International Application Serial No. PCT/IB2008/000011, mailed on Aug. 11, 2008, 22 pages.

(Continued)

*Primary Examiner* — Sharad Rampuria
(74) *Attorney, Agent, or Firm* — Squire Sanders (US) LLP

(57) ABSTRACT

Various example embodiments are disclosed relating to relay networks or multi-hop networks, and also relating to power control and channel reuse techniques for wireless relay networks. A technique of power control in a wireless relay network may include receiving a channel measurement report via a relay station from a mobile station attached to the relay station, and determining a mobile station-specific downlink data transmission power level for the relay station to transmit data to the mobile station based at least in part on the received channel measurement report from the mobile station.

19 Claims, 12 Drawing Sheets

U.S. PATENT DOCUMENTS

2008/0049678 A1* 2/2008 Chindapol et al. ............ 370/331
2008/0132166 A1 6/2008 Park et al.

FOREIGN PATENT DOCUMENTS

| GB | 2424544 A | 9/2006 |
| GB | 2426665 A | 11/2006 |
| GB | 2428538 A | 1/2007 |
| WO | 2008/084371 A2 | 7/2008 |
| WO | 2008/084371 A3 | 11/2008 |

OTHER PUBLICATIONS

Viswanatha, Harish, et al., "Performance of Cellular Networks With Relays and Centralized Scheduling", IEEE Transactions on Wireless Communications, vol. 4, No. 5, Sep. 2005, pp. 2318-2328.

"Part 16: Air Interface for Fixed Broadband Wireless Access Systems", IEEE Standard for Local and Metropolitan Networks, 2004, 1-893.

* cited by examiner

POWER CONTROL AND CHANNEL REUSE TECHNIQUES FOR WIRELESS RELAY NETWORKS

This application claims the benefit of priority based on U.S. Provisional Patent Application No. 60/884,016, filed on Jan. 8, 2007, entitled, "Power Control and Channel Reuse Techniques for Wireless Relay Networks," the disclosure of which is hereby incorporated by reference.

BACKGROUND

The rapid diffusion of Wireless Local Area Network (WLAN) access and the increasing demand for WLAN coverage is driving the installation of a very large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. Other wireless technologies are being developed, such as IEEE 802.16 or WiMAX technology. A number of different 802.11 task groups are involved in developing specifications relating to improvements to the existing 802.11 technology.

Many wireless networks allow for power control where a base station may provide a control signal to instruct a mobile station to increase or decrease its transmission power level. Relay networks have also been proposed, which may include a base station (or access point), one or more mobile stations, and one or more relay stations. However, there is a need for improved power control in wireless relay networks.

SUMMARY

Various example embodiments are disclosed relating to relay networks or multi-hop networks, and also relating to power control and channel reuse techniques for wireless networks.

According to an example embodiment a technique is provided that may include receiving a neighbor measurement report from one or more relay stations in a wireless network, the neighbor measurement report indicating channel quality for signals received at the reporting relay station from one or more neighbor wireless nodes, and determining a maximum transmission power level for each of the one or more relay stations based on the received neighbor measurement reports.

According to another example embodiment, a technique is provided that includes receiving a channel measurement report via a relay station from a mobile station attached to the relay station, the channel measurement report indicating a channel quality for signals received at the mobile station from the relay station, and determining a mobile station-specific downlink data transmission power level for the relay station to transmit data to the mobile station, the determining being performed based at least in part on the received channel measurement report from the mobile station.

According to another example embodiment, a technique is provided that may include receiving a first channel measurement report via a first relay station from a first mobile station attached to the first relay station, and receiving a second channel measurement report via a second relay station from a second mobile station attached to the second relay station. The first channel measurement report may indicate a channel quality for signals received at the first mobile station from the first relay station and the second channel measurement report may indicate a channel quality for signals received at the second mobile station from the second relay station. The technique may also include assigning the first mobile station and the second mobile station to a same channel for downlink data transmission from the first and second relay stations, respectively, if the channel quality in the first measurement report and the channel quality in the second measurement report are greater than a threshold.

According to yet another example embodiment, a technique is provided that may include receiving a channel measurement report via a first relay station from each of a plurality of mobile stations attached to the first relay station, each of the channel measurement reports received via the first relay station indicating a channel quality for signals received at the mobile station from the first relay station. The technique may include receiving a channel measurement report via a second relay station from each of a plurality of mobile stations attached to the second relay station, each of the channel measurement reports received via the second relay station indicating a channel quality for signals received at the mobile station from the second relay station. The technique may also include determining a mobile station-specific downlink data transmission power level for the first relay station for each of the plurality of mobile stations attached to the first relay station based at least in part on the received channel measurement reports received from the mobile stations attached to the first relay station, and determining a mobile station-specific downlink data transmission power level for the second relay station for each of the plurality of mobile stations attached to the second relay station based at least in part on the received channel measurement reports received from the mobile stations attached to the second relay station.

The details of one or more implementations are set forth in the accompanying drawings and the description below. Other features will be apparent from the description and drawings.

DETAILED DESCRIPTION

Figure 1:
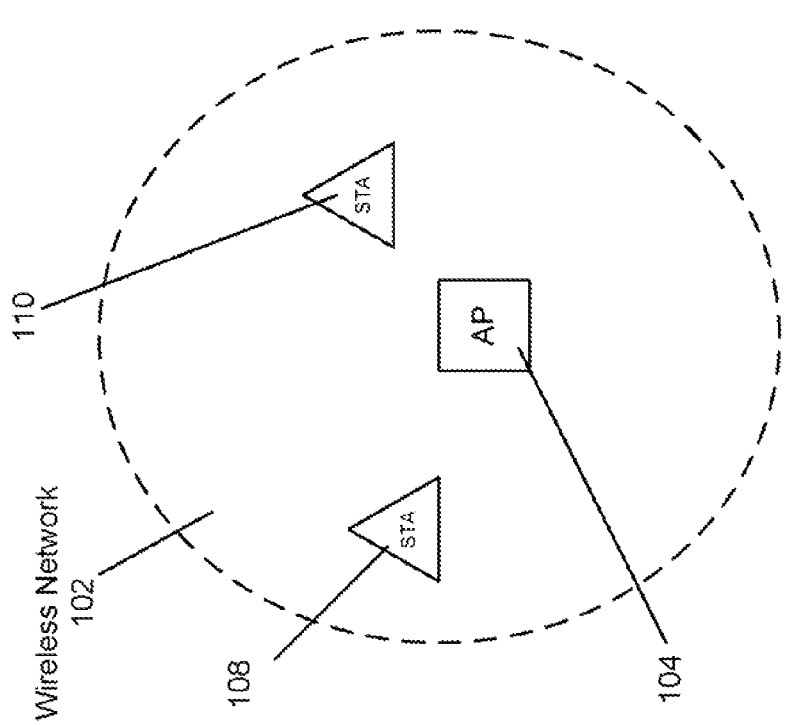
FIG. 1 is a block diagram illustrating a wireless network according to an example embodiment.

Referring to the Figures in which like numerals indicate like elements, FIG. 1 is a block diagram illustrating a wireless network 102 according to an example embodiment. Wireless network 102 may include a number of wireless nodes or stations, such as an access point (AP) 104 or base station and one or more mobile stations or subscriber stations, such as stations 108 and 110. While only one AP and two mobile stations are shown in wireless network 102, any number of APs and stations may be provided. Each station in network 102 (e.g., stations 108, 110) may be in wireless communication with the AP 104, and may even be in direct communication with each other. Although not shown, AP 104 may be coupled to a fixed network, such as a Local Area Network (LAN), Wide Area Network (WAN), the Internet, etc., and may also be coupled to other wireless networks.

Figure 2:
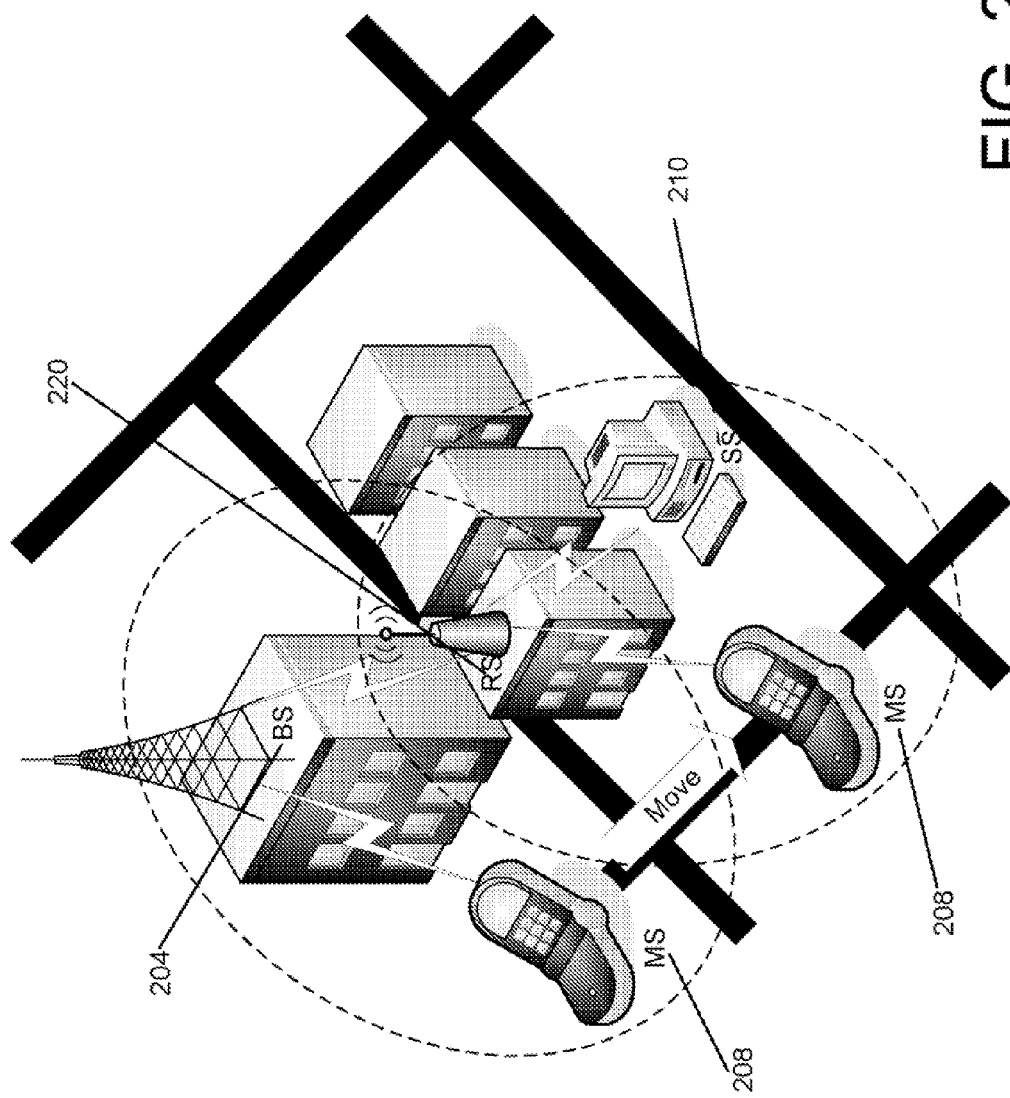
FIG. 2 is a block diagram illustrating a wireless network according to an example embodiment.

FIG. 2 is a block diagram illustrating a wireless network according to an example embodiment. According to an example embodiment, a mobile station MS 208 may initially communicate directly with a base station BS 204, for example, and a subscriber station 210 may communicate with the base station BS 204 via a relay station RS 220. In an example embodiment, the mobile station 208 may travel or move with respect to base station BS 204. For example, the mobile station MS 208 may move out of range of the base station BS 204, and may thus begin communicating with the base station 204 via the relay station 220 as shown in FIG. 2.

Figure 3:
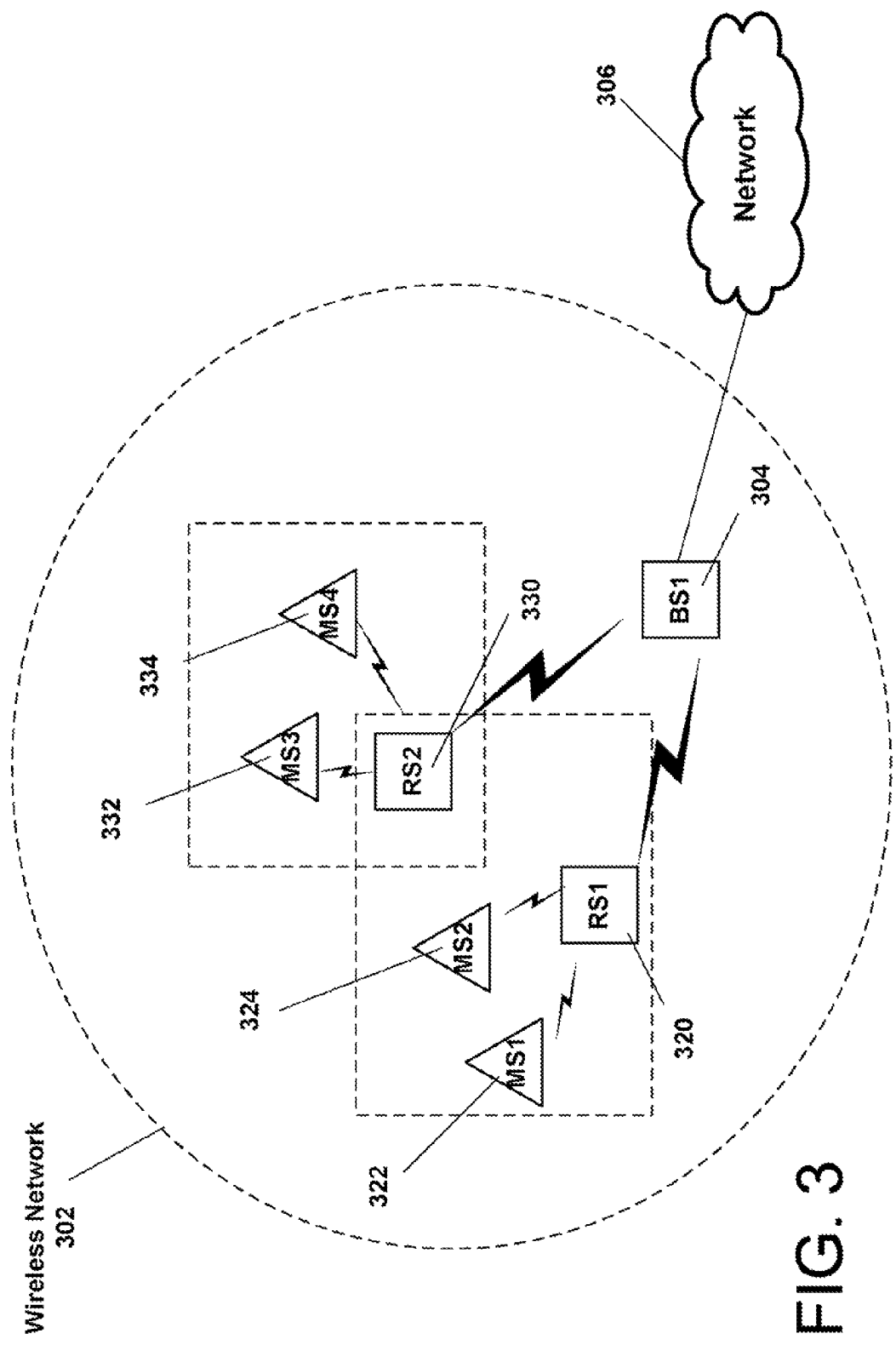
FIG. 3 is a block diagram illustrating a wireless relay network according to an example embodiment.

FIG. 3 is a block diagram illustrating a wireless network 302 according to an example embodiment. Wireless network 302 may include a number of wireless nodes or stations, such as base station BS1 304, relay stations RS1 320 and RS2 330, a group of mobile stations, such as MS1 322 and MS2 324 communicating with (or attached to or served by) relay station RS1 320, and MS3 332 and MS4 334 communicating with (or attached to or served by) relay station RS2 330. As shown, relay stations RS1 320 and RS2 330 may be within communication range of each other, e.g., depending on a transmission power used by each. Also, relay stations RS1 320 and RS2 330 may also be able to transmit to mobile stations attached to other relay stations (or to each other), which in some cases may cause interference. While only one base station, two relay stations, and four mobile stations are shown in wireless network 302, any number of base stations, relay stations, and mobile stations may be provided. The base station 304 may be coupled to a fixed network 306, such as a Wide Area Network (WAN), the Internet, etc., and may also be coupled to other wireless networks. Mobile stations MS1 322 and MS2 324 may communicate with base station BS 304 via relay station RS1 320, while mobile stations (or subscriber stations) MS3 332 and MS4 334 may communicate with base station BS 304 (or access point) via relay station RS2 330, for example.

In an example embodiment, the various mobile stations/subscriber stations such as 322, 324, 332, and 334 may include mobile or cellular telephones, wireless digital assistants (PDAs), or other types of wireless devices, or mobile stations. The term "node" or "wireless node" or "network node" or "network station" may refer, for example, to a wireless station, e.g., a subscriber station or mobile station, an access point or base station, a relay station or other intermediate wireless node, or other wireless computing device, as examples. Wireless node 330 may include, for example, a relay station or other node. Wireless node 304 may be, for example, a base station (BS), access point (AP) or other wireless node. Wireless node 304 may be coupled to a fixed network, such as network 306, for example. Frames or traffic flowing from mobile stations (e.g., MS1 322, MS2 324, MS3 332, MS4 334) to relay stations (RS1 320, RS2 330) or from relay stations RS1 320, RS2 330 to BS 304 may be referred to as flowing in the uplink (UL) or upstream direction, whereas frames or traffic flowing from BS 304 to relay stations (RS1 320, RS2 330) or from relay stations RS1 320, RS2 330 to mobile stations (e.g., MS1 322, MS2 324, MS3 332, MS4 334) may be referred to as the downlink (DL) or downstream direction.

The various example embodiments described herein may be applicable to a wide variety of networks and technologies, such as WLAN networks (e.g., IEEE 802.11 type networks), IEEE 802.16 WiMAX networks, relay networks, 802.16 Mobile Multi-hop Relay (MMR) networks, as referenced in IEEE 802.16 WG, WiMedia networks, Ultra Wide Band networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various example embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

In an example embodiment, the various base stations may be Multi-hop Relay—Base Stations (MR-BS), which may be base stations capable of handling one or more relay stations that may be provided between the base station and the mobile stations within the network.

A wireless relay network may be an example of a multi-hop system in which end nodes, for example, mobile stations or subscriber stations (MS/SS), may be connected to a base station via one or more relay stations, such as RS1 320 and RS2 330, for example. Traffic between the mobile stations or subscriber stations and the base station may pass through, and be processed by, the relay stations RS1 320 and RS2 330, for example. As an example, a relay station may be used to extend the network coverage and/or enhance the system throughput. For example, the traffic sent from a relay station may be scheduled by the relay station itself or scheduled by the base station instead. In some cases, a relay station may receive and decode a frame from a base station, and then forward the frame to the respective mobile station or subscriber station.

The term "wireless node" or "network station" or "node," or the like, may include, for example, a wireless station, such as a mobile station or subscriber station, an access point (AP) or base station, a relay station, a wireless personal digital assistant (PDA), a cell phone, an 802.11 WLAN phone, a WiMedia device, a WiMAX device, a wireless mesh point, or any other wireless device. These are merely a few examples of the wireless devices and technologies that may be used to implement the various example embodiments described herein, and this disclosure is not limited thereto.

Figure 4:
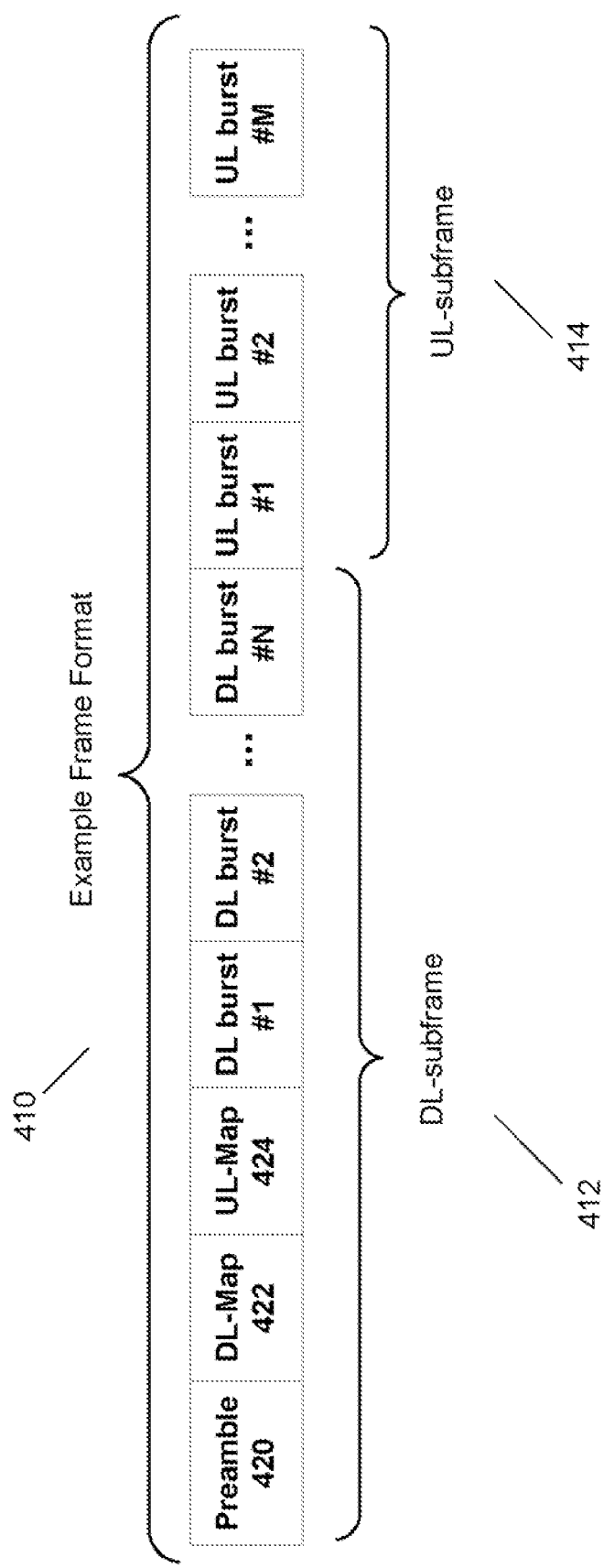
FIG. 4 is a diagram illustrating a frame format according to an example embodiment.

FIG. 4 is a diagram illustrating a frame format according to an example embodiment. A frame 410 may include a downlink (DL) subframe 412 and an uplink (UL) subframe 414. The DL subframe 412 may include a preamble 420 which may allow wireless nodes (e.g., mobile stations or other nodes) to synchronize to the transmitting node, a DL Map 422, a UL Map 424, one or more DL data bursts, such as DL burst #1, DL burst #2, . . . DL burst #N, and one or more UL data bursts, including UL burst #1, UL burst #2, . . . UL burst #M. Other fields, not shown, may also be included in frame 410. Frame 410 may be used, for example, for an OFDMA (Orthogonal Frequency Division Multiple Access) frame for IEEE 802.16 wireless networks, WLAN or for other networks. This is just an example frame format and the various embodiments are not limited thereto. A wide variety of frame formats may be used.

In addition, the frame 410 may be used in wireless relay networks, e.g., wherein the DL subframe is transmitted from a base station to one or more relay stations, and then each relay station may transmit the DL subframe 412 to the mobile stations attached (or serviced by) the relay station, for example. The UL subframe 414 may provide opportunities (UL bursts), e.g., upon request, for the mobile stations to transmit data in an UL direction at scheduled times.

The DL Map 422 may provide information regarding DL data transmissions (or DL data bursts). For example, the DL Map 422 may include a DL Map Information Element (IE) for each DL data burst to provide information describing each DL burst, such as, for example: a code identifying a burst profile that may describe a coding or forward error correction (FEC) type and a modulation type or scheme to be used for this DL burst, a connection ID (CID) for this burst (e.g., to assign the DL burst to a specific mobile station), an OFDMA symbol offset which may indicate a DL transmission time for this DL burst, and a subchannel offset which may specify a specific frequency or subcarrier for this DL burst. In an example embodiment, the OFDMA symbol offset (time) and subchannel offset (subcarrier frequency) may specify the channel assigned to this DL burst.

In an example embodiment, the DL Map IE may also include a boosting value (or field) for each DL burst (or each mobile station) to indicate a downlink data transmission power level from a relay station for this DL data burst. Thus, because each DL (data) burst, such as DL burst #1, DL burst #2, . . . DL burst #N, may be assigned to a different mobile station(s) via the CID field in the DL Map IE, the boosting value in the DL Map IE may indicate a mobile station-specific downlink data transmission power level to be used by the relay station to transmit data to the mobile station for the specific DL data burst.

In an example embodiment, a base station may specify a maximum transmission power level for each relay station that is coupled to or serviced by the base station. This maximum transmission power level for the relay station may be referred to herein, for example, as RS_EIRP, which may be described as the (maximum) relay station effective isotropic radiated power. Also, in an example embodiment, a base station may determine or specify different transmission power levels to be used by a relay station, including: 1) a relay station-specific transmission power level to be used by the relay station to transmit preamble/control signals, such as for the transmission of a preamble, DL Map, UL Map; and 2) a mobile station-specific downlink data transmission power level to be used by the relay station to transmit data to the mobile station for the specific DL data burst, which may include a different DL data transmission power level to be used for DL data transmission for each burst or to each mobile station.

In an example embodiment, the transmission power level to be used by a relay station for the transmission of preamble/control signals may be set to the maximum transmission power level for the relay station (RS_EIRP), for example. For example, the maximum transmission power level for a relay station (RS_EIRP) may be varied or adjusted by a base station, e.g., to decrease interference between different (or neighbouring) relay stations. As a result, in an example embodiment, as the RS_EIRP or maximum transmission power level for a relay station is adjusted or varied by a base station, this may also adjust the transmission power level to be used by the relay station for the transmission of preamble/control signals (since power level for preamble/control signals may be set to the maximum transmission power level for the relay station), according to an example embodiment.

In an example embodiment, the base station may adjust the maximum transmission power level for each relay station based on neighbour measurement reports received from the relay stations. Each relay station may scan to receive preamble signals or signature signals from neighbouring relay stations and/or base stations, and measure the received signal strength of these preamble signals from the neighbouring relay stations/base stations. Each relay station may transmit, for example, a neighbour measurement report to the base station to report the received signal strength of the received signals from neighbouring nodes. The base station may adjust the maximum transmission power level for each relay station based on one or more of the received neighbour measurement reports.

For example, two relay stations, RS1 and RS2 may measure the received signals strength (RSSI) of the received signals from the other relay station and provide this RSSI value to the base station in a neighbour measurement report, for example. The report from RS1 may indicate that signals from RS2 are received at RS1 at a RSSI of −60 dBm, which may be determined by the base station to interfere with RS1. Thus, based on the neighbour measurement report from RS1, the base station may determine to decrease the maximum transmission power level for RS2 so as to decrease the interference with RS1 (e.g., because the transmitted signals from RS2 may be too strong and may likely interfere with RS1, in this example). If there are mobile stations that are no longer in range of RS2, e.g., based on the new/decreased maximum transmission power level for RS2 (which may be used for preamble and control transmission power level for RS2), then these out-of-range mobile stations may be, for example, handed off to other relay stations or base stations that may be closer.

Other factors, data or measurements may also be used to determine or adjust a maximum transmission power level for each relay station. In an example embodiment, a relay station may typically transmit at any transmission power level up to but not exceeding the maximum transmission power level for the relay station. A base station may assign a different maximum transmission power level for each relay station, e.g., based on one or more received measurement reports from the relay stations.

A base station may determine or set a mobile station-specific (or burst-specific) downlink data transmission power level to be used by a relay station to transmit data to the mobile station for the specific DL data burst. A base station may set or determine the mobile station-specific downlink data transmission power levels for each relay station, e.g., for RS1, RS2, . . . RSN, and for each of the mobile stations attached to (or served by) the relay station. This may allow, for example, power control to be provided by the base station or other entity, such that the relay station may transmit data at a data transmission power level sufficient to reach a specific mobile station, and which may decrease interference with other relay stations and may decrease power consumption by each relay station (or at least avoid excessive power consumption) for data transmission.

In an example embodiment, a base station may indicate a DL data transmission power level to be used by a relay station to transmit data to the mobile station for the specific DL data burst using a boosting value in a DL Map, such as the boosting value provided by IEEE 802.16e DL-Map Information Element (IE). DL Map IE may be provided within a DL Map for each burst or for each mobile station. In an example embodiment, the DL Map IE may include a boosting value (or field) for each burst (or mobile station) to indicate a downlink data transmission power level to be used by a relay station for this DL data burst. Thus, because each DL (data) burst, such as DL burst #1, DL burst #2, . . . DL burst #N, may be assigned to a different mobile station(s) via the CID field in the DL Map IE. The boosting value in the DL Map IE may indicate a mobile station-specific downlink data transmission power level to be used by the relay station to transmit data to the mobile station for the specific DL data burst.

According to an example embodiment, the boosting value or boosting field within the DL Map IE may be a multi-bit value, such as a 3-bit value to indicate various boosting amounts for each mobile station. As an example, the boosting value may use, the 3-bit boosting field from OFDMA DL-MAP_IE format in 802.16e standard (000: no boosting; 001: +6 dB; 010: −6 dB; 011: +9 dB; 100: +3 dB; 101: −3 dB; 110: −9 db; 111: −12 dB). Thus, a boosting value may be specified for each mobile station in increments of 3 dB from −12 dB to 9 dB, in this example. The boosting value may indicate a DL data transmission power to be used by a relay station to transmit data to a mobile station, and may be provided as a value relative to a non-boosted power level. In an example embodiment, the non-boosted power level may be set to 9 dB less than the maximum transmission power level for the relay station. Thus, a maximum boosting value may be specified as +9 B, which would be equal to the maximum transmission power level for the relay station. The maximum RS data transmission power may be used (as the DL data transmission power) for the longest link range mobile station (e.g., to transmit to the most distant mobile station). The base station or the relay station may typically select a boosting value +9 dB to transmit to the most distant mobile station (e.g., requiring the most power). Other mobile stations, which may be located nearer to the relay station, may use a boosting value of less than +9 dB (or require less transmission power). Thus, a different boosting value (or different DL data transmission power level) may be specified for each mobile station.

Figure 5:
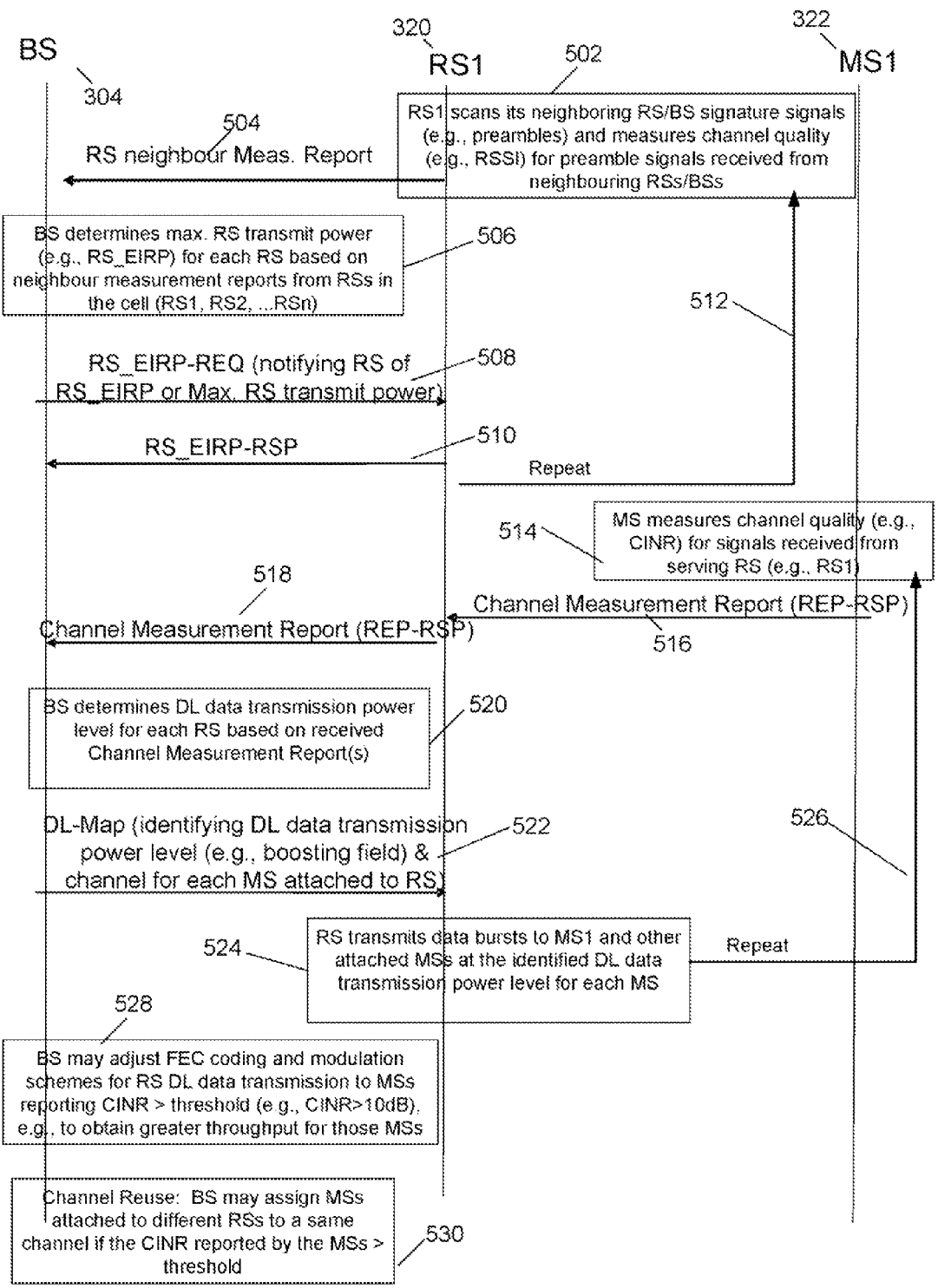
FIG. 5 is a diagram illustrating operation of a wireless relay network according to an example embodiment.

FIG. 5 is a diagram illustrating operation of a wireless relay network according to an example embodiment. As shown in FIG. 5, a base station 304, a relay station, RS1 320, and a mobile station, MS1 322 are shown, and may correspond to the same wireless nodes illustrated in FIG. 3. Although only one relay station and one mobile station are shown in FIG. 5, the network may include any number of relay stations and mobile stations, and the illustrated operation is merely an example operation.

With reference to FIG. 5 (e.g., with respect to operations 502, 504, 506, 508, 510, 512), an example embodiment for determining or updating a maximum RS transmission power level for relay stations will be briefly described.

At 502, MS1 322 may scan its neighbouring RS/BS signals (e.g., preambles or signature signals) to measure channel quality (e.g., RSSI) of these signals received from these neighbouring wireless nodes. These received and measured signals may include a preamble, postamble or other signals transmitted by neighbouring nodes. For example, a preamble from each RS/BS may include a unique signature (e.g., PN code) to identify the transmitting node.

At 504, RS1 320 may transmit a RS neighbour measurement report to BS 304, which may include the channel quality (e.g., RSSI) signals received at RS1 320 from each neighbour, a segment ID to identify the subcarrier or frequency used by the neighbour, and an identification of the neighbour node or neighbour relay station. Although not shown, BS 304 may also receive RS neighbour measurement reports from other relay stations, such as from RS2, RS3, RS4, RS5, etc.

In an example embodiment, each relay station may scan and measure signals from its neighbours, and send RS neighbour measurement reports to BS 304 every 480 ms, or every 0.5 s, for example, or at other period or interval, or upon request from BS 304, for example.

At 506, BS 304 may determine a maximum RS transmission power level (e.g., RS_EIRP) for each relay station, based on the received neighbour measurement reports. For example, if neighbour measurement reports from RS2 and RS3 indicate a relatively weak signal (e.g., received signal strength) from RS1 (e.g., −100 dBm or a signal level near the noise level), then BS 304 may increase the maximum RS transmission power level for RS1, e.g., to allow RS1 to better reach mobile stations that may be farther away. On the other hand, if one or more neighbour measurement reports from RS2 and RS3 indicate a relatively strong signal received from RS1 (e.g., −60 dBm), then BS 304 may decrease the maximum RS transmission power level for RS1, e.g., to decrease interference from RS1 to its neighbouring nodes (e.g., RS2, RS3). These are merely some examples of how BS 304 may determine a maximum RS transmission power level for one or more relay stations.

At 508, BS 304 may transmit a RS_EIRP-REQ message to RS1 320 indicating the new maximum transmission power level (e.g., RS_EIRP) for RS1. Similarly, BS 304 may transmit messages to each of the other relay stations to notify them of their updated maximum RS transmission power levels. At 510, RS1 320 may send a reply message, RS_EIRP-RSP back to BS 304. RS1 may then implement the new or updated maximum transmission power level, which may include adjusting (e.g., increasing or decreasing) the transmission power level to be used by the relay station RS1 320 for the transmission of preamble/control signals. The updated maximum transmission power level for RS1 may also provide a new or updated limit (or maximum) for the mobile station-specific (or burst-specific) DL data transmission power levels used by RS1 320. Other relay stations may receive and use their updated maximum transmission power levels in a similar fashion.

At 512, the process moves back to block 502, where the operations 502, 504, 506, 508 and 510 may be repeated, e.g., to allow new or updated measurement reports to be received by the BS 304 from the relay stations (e.g., RS1, RS2, RS3, . . . ), and then for the BS 304 to determine updated maximum RS transmission power levels for each relay station.

With reference to FIG. 5 (e.g., with respect to operations 514, 516, 518, 520, 522, 524, 526), an example embodiment for determining or updating mobile station-specific DL data transmission power levels at relay stations will now be briefly described. At 514, MS1 322 measures channel quality (e.g., carrier-to-interference- and noise-ratio or CINR) of signals received by MS1 322 from the serving relay station (RS1 320). In some cases, MS1 may also measure channel quality (e.g., RSSI) of other (neighbouring) nodes (e.g., RS2, RS3, RS4 . . . ). Likewise, other mobile stations attached to RS1, RS2, RS2, etc. may measure a channel quality (e.g., CINR or RSSI) of signals received from their serving relay station, and possibly from other relay stations/base stations.

At 516, MS1 322 may send a channel measurement report (e.g., REP-RSP) indicating a channel quality for signals received at the mobile station from the serving relay station (and possibly from other relay stations or nodes). Although not shown, other mobile stations may likewise send their measurement reports to their serving relay stations.

At 518, RS1 may forward the channel measurement report to BS 304. Thus, BS 304 may receive the channel measurement report from MS1 322 via RS1 320. Although not shown, other relay stations may similarly forward channel measurement reports received from their attached mobile stations to BS 304.

In an example embodiment, each mobile station may, for example, measure channel quality for the serving relay station and send channel measurement reports every 480 ms, or about every 0.5 seconds. These channel measurements may be performed or provided as part of the handover measurement reports provided by mobile stations. Thus, in an example embodiment, a relay station may receive and forward the channel measurement reports provided as a separate process, or as part of the handover measurement reports provided by mobile stations. This report (or reports) may be used by BS 304 to determine an updated DL data transmission power for each data burst or each mobile station (since each data burst may be assigned to a different mobile station or user).

At 520, BS 304 may determine, e.g., based at least in part on the received channel measurement report(s), a mobile station-specific DL data transmission power to be used by RS1 320 for data transmission to MS1 320, MS2, and other mobile stations (or for burst #1, burst #2, burst #3, . . . ). BS 304 may likewise determine DL data transmission power levels for bursts or attached mobile stations for other relay stations (e.g., RS2, . . . ). Alternatively, the BS 304 may determine DL transmission power levels for each burst or mobile station based on the received channel measurement reports (from mobile stations) and/or the received RS neighbour measurement reports (from relay stations).

At 522, the base station BS 304 may send a message, such as a DL Map, to the relay station RS1 320 identifying the DL data transmission power level for one or more (or even all) of the mobile stations attached to RS1 320. BS 304 may identify a DL data transmission power level to be used by a relay station to transmit data to a mobile station, for example, using a boosting value (e.g., a boosting value in a DL Map IE). The boosting value may indicate a relative transmission power, for example, an amount of boost (or change in power) to be applied to a non-boosted transmission power level.

At 524, the relay station RS1 320 may transmit data bursts to MS1 and other mobile stations being served by RS1 320, at the identified (or determined) DL data transmission power levels, e.g., as indicated by the boosting value for each mobile station.

A 520, a variety of different techniques may be used to determine DL transmission power levels. For example, the base station may adjust (increase or decrease) the DL data transmission power level for each attached mobile station to decrease unnecessary interference to neighbouring relay stations or base station, to provide sufficient transmission power serve all the mobile stations attached to the relay station, to conserve battery power for the relay station, and/or allow for greater channel re-use, and/or for other reason.

In an example embodiment, the DL data transmission power may be (e.g., periodically) adjusted to maintain the channel quality for DL signals received at the mobile station at approximately (or around) a target signal or channel quality (e.g., 10 dB). For example, a mobile station-specific DL transmission power level to be used by the relay station (RS1) for transmitting data to a mobile station (MS1) (e.g., during burst #1) may be decreased if the channel quality of signals received at the mobile station (e.g., channel quality indicated in the channel measurement report from the mobile station) is greater than (or exceeds) a threshold. Similarly, the DL data transmission power to be used by a relay station to transmit data to the mobile station may be increased if the channel quality of signals received at the mobile station (e.g., indicated in the channel measurement report from the mobile station) is less than a threshold.

In another example embodiment, the mobile station-specific downlink data transmission power level for the mobile station may be decreased if the channel quality indicated in the channel measurement report from the mobile station (or the channel quality of signals received by the mobile station from the relay station) is greater than a first threshold value (e.g., greater than 13 dB in an example). And, the mobile station-specific downlink data transmission power level for the mobile station may be increased if the channel quality indicated in the channel measurement report from the mobile station (or the channel quality of signals received by the mobile station from the relay station) is less than a second threshold value (e.g., less than 10 dB in an example).

In an example embodiment, the downlink data transmission power level may be increased or decreased by adjusting the boosting value for the mobile station. For example, if the channel quality (e.g., CINR) of signals received at MS1 from RS1 is less than 10 dB, the boosting value for the mobile station may be increased to the next value, e.g., from +3 dB to +6 dB. This may operate to cause the relay station RS1 to increase DL data transmission power by +3dB for that burst or mobile station. Similarly, if the channel quality (e.g., CINR) of signals received at MS1 from RS1 is greater than 13 dB, the boosting value for the mobile station may be decreased to the next lower value, e.g., from +6 dB to +3 dB (or from −3 dB to −6 dB). This process (operations 514, 518, 520, 522, 524, etc.) may be repeated (operation 526), to allow the base station to continuously or iteratively adjust the DL data transmission power level for each mobile station or burst.

In an example embodiment, these first and second thresholds (10 dB and 13 dB in this example) may be based on a target or minimum channel quality (e.g., 10 dB in this example) and the quantization steps between sequential boosting values (3 dB in this example for a 3-bit boosting value).

If the base station has increased the boosting value to a top value of +9 dB for transmitting data to a mobile station (meaning that the data transmission power level is now equal to the maximum transmission power level for the relay station), but the channel quality for signals received at the mobile station from the relay station is still less than the threshold or target (e.g., less than 10 dB), the base station may not typically increase the boosting value for the mobile station further, for example. Rather, in an example embodiment, the base station may, for example: 1) increase the maximum transmission power for the relay station (e.g., by sending an updated RS_EIRP value to the relay station), which may cause the non-boosted value to increase, and to allow further boosting of transmission power to be performed for the mobile station (since boosting value is with respect to the non-boosted power level); or 2) cause or instruct, or allow, the relay station to drop to the mobile station (which may be relatively far away from the relay station) and allow another relay station or base station to serve the mobile station. Other actions may be performed as well.

At 528, the base station BS 304 may adjust a FEC coding type and/or modulation type or scheme for the mobile station if the channel quality of signals received is greater than a threshold (e.g., greater than 10 dB). For example, if the CINR for signals received at MS1 from RS1 is 12 dB, a higher modulation scheme (e.g., 32 QAM or 16 QAM instead of QPSK) and a more favorable coding scheme may be used for the mobile station to improve throughput based on the improved channel quality. Thus, in an example embodiment, a modulation scheme and/or coding scheme used by the relay station for downlink data transmission to the mobile station may be adjusted if the channel quality for signals received at the mobile station (e.g., as indicated in the channel measurement report from the mobile station) is greater than a threshold (or less than a threshold). This may involve, for example, adaptive modulation and coding (AMC) based on the current CINR for the mobile station, e.g., to improve data throughput when channel quality is improved.

At 530, one or more techniques may be used to perform channel reuse. For example, a BS may assign a same channel (e.g., a same time and subcarrier) to two (or more) mobile stations served by different relay stations within a same network (within range of the same base station) if the channel quality (e.g., CINR) for signals received at the mobile stations (or reported by the mobile stations) exceeds a threshold. For example, BS 304 may assign channel 1 to both MS1 (served by RS1) and MS3 (served by RS2) if the CINR reported by both MS1 and MS3 is greater than 10 dB, for example. A high CINR for mobile stations may indicate that significant interference is not present, and thus, the two serving relay stations are not substantially interfering with each other at these mobile stations (e.g., non-overlapping coverage for RS1 and RS2, at least at MS1 and MS3). Thus, in an example embodiment, a same channel, in some cases, may be assigned to (or reused) for mobile stations attached to different relay stations where the RS-MS DL transmissions for the mobile stations do not substantially interfere. In an example embodiment, a base station may group together or assign a same channel for two mobile stations by specifying within a DL Map 422, for example, an OFDMA symbol offset (indicating a DL transmission time for this DL burst) and a subchannel offset to be the same for the two bursts or two mobile stations.

If after two or more mobile stations have been grouped together (using the same channel for channel reuse) for one or more frames, the base station may subsequently un-group these two mobile stations if, for example, the channel quality or CINR for one or more of the base stations drops below the target or threshold channel quality (e.g., CINR less than 10 dB), in an example embodiment.

According to an example embodiment, a relay station DL power control may be applied to reduce interference between relay stations, to allow a relay station to consume less power (e.g., base on using a lower data transmission power to some mobile stations), and to allow for increased opportunities for channel reuse (at least in some cases).

Figure 6:
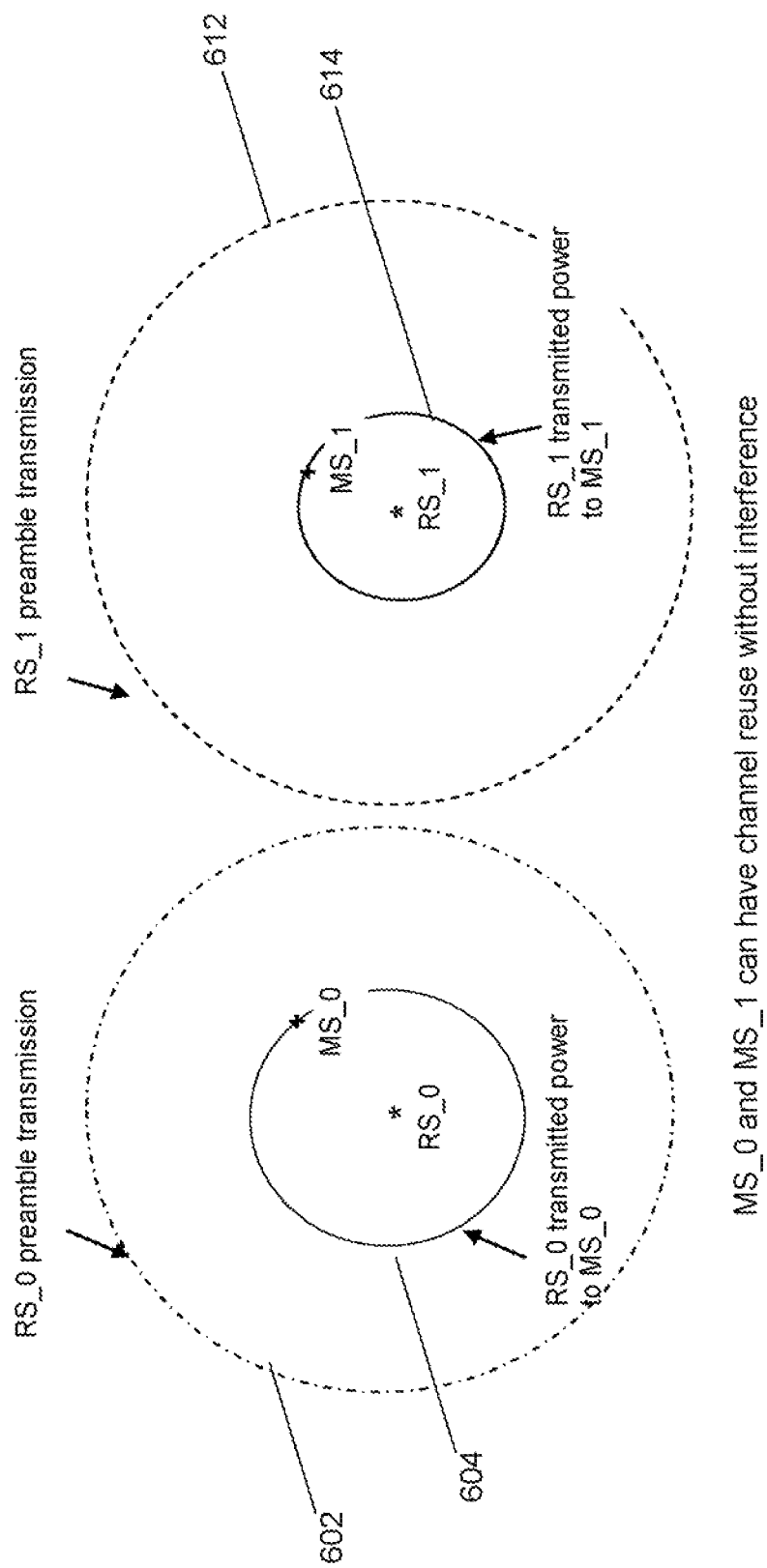
FIG. 6 is a diagram illustrating channel reuse according to an example embodiment.

FIG. 6 is a diagram illustrating channel reuse according to an example embodiment. Two relay stations are shown, including RS_0 and RS_1. RS_0 may transmit a preamble at a preamble transmission power level 602 (which may be set equal to the maximum power transmission level of RS_0). RS_1 may transmit a preamble at a preamble transmission power level 612 (which may be set equal to the maximum power transmission level of RS_0). RS_0 may transmit DL data to MS_0 at a DL data transmission power level 604. Similarly, RS_1 may transmit DL data to MS_1 at a DL data transmission power level 614. In this example, a same channel may be assigned to both MS_0 and MS_1 because, for example, the RS_0-MS_0 and RS_1-MS_1 DL data transmissions are not substantially interfering with each other at these mobile stations (e.g., non-overlapping coverage for RS_0 and RS_1, at least at MS_0 and MS_1). Thus, for example, the CINR (or channel quality) for signals received by MS_0 and MS_1 may typically be fairly good, or may be greater than the threshold value due to the lack of substantial interference, in this example.

Figure 7:
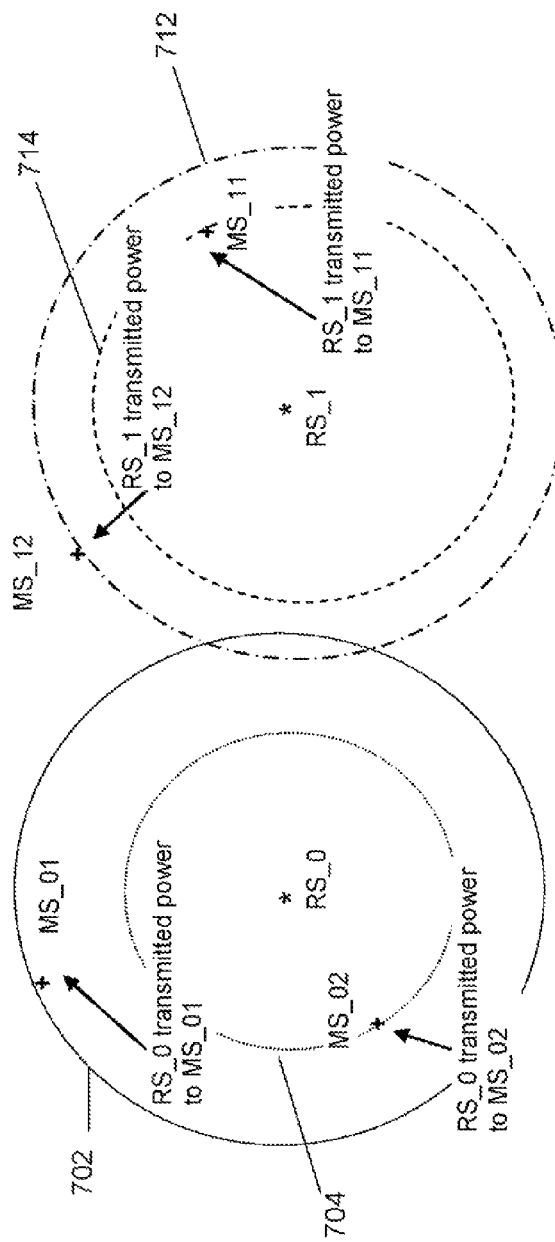
FIG. 7 is a diagram illustrating channel reuse according to another example embodiment.

FIG. 7 is a diagram illustrating channel reuse according to another example embodiment. Two relay stations are shown, including RS_0 and RS_1. RS_0 server two mobile stations, including MS_01 and MS_02. RS-0 may transmit at a DL data transmission power level 702 to MS_01, and may transmit at a DL data transmission power level 704 to MS_02.

RS_1 serves two mobile stations, including MS_11 and MS_12. RS_1 may transmit at a DL data transmission power level 712 to MS_11, and may transmit at a DL data transmission power level 714 to MS_12. As can be seen, a first group of MS_01 and MS_11 may be grouped together (use a same channel for channel reuse), and a second group of MS-02 and MS_12 may be grouped together (use same channel), due to lack of interference. However, in this example embodiment, MS_01 and MS_12 should, for example, not be grouped together (for channel reuse) due to interference from their serving relay stations.

In a similar fashion to the DL channel reuse described above, the base station may assign a same channel for UL data transmission from two mobile stations to their serving relay stations, e.g., if the channel quality of received signals at each mobile station exceeds a threshold. Alternatively, a same UL channel (UL channel reuse) may be assigned to two mobile stations for different serving relay stations within same coverage of a base station, if a channel quality (e.g., CINR) of UL signals at both RSs from the mobile stations are greater than a threshold (e.g., greater than 10 dB). A high channel quality at the relay stations of UL signals from the mobile stations may likely indicate that there is not substantial interference by the two mobile stations as measured at the relay stations, and thus, the two mobile stations may be good candidates for UL channel reuse.

Figure 8:
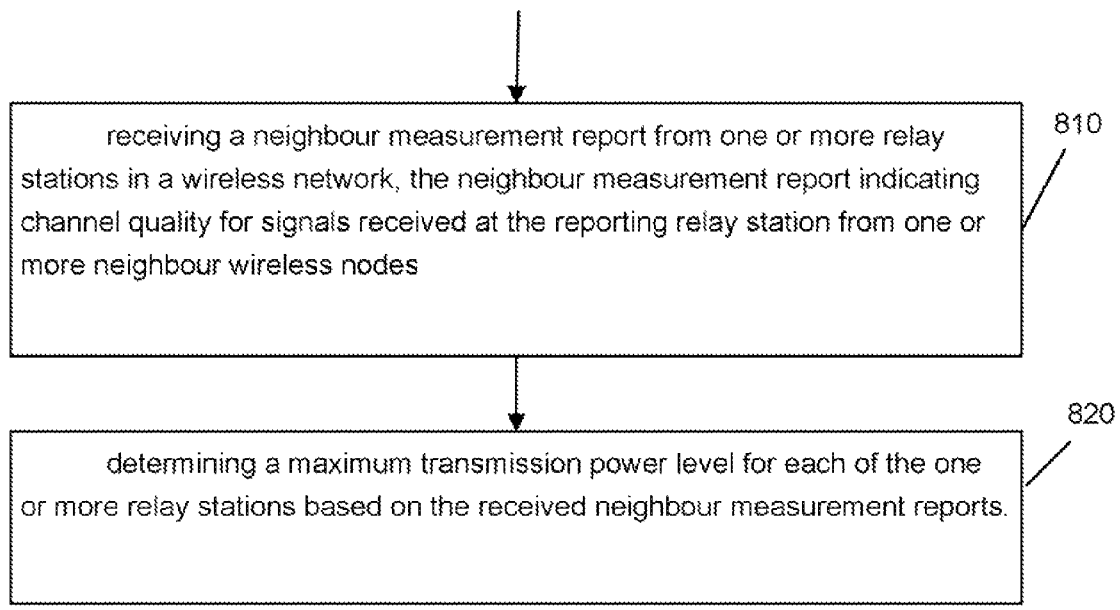
FIG. 8 is a flow chart illustrating operation of a wireless node according to an example embodiment.

FIG. 8 is a flow chart illustrating operation of a wireless node according to an example embodiment. At 810, a neighbor measurement report is received (e.g., at a base station, AP or other node) from one or more relay stations in a wireless network, the neighbor measurement report indicating channel quality for signals received at the reporting relay station from one or more neighbor wireless nodes.

At 820, a maximum transmission power level may be determined (e.g., by the base station, AP or other node) for each of the one or more relay stations based on the received neighbor measurement reports.

Figure 9:
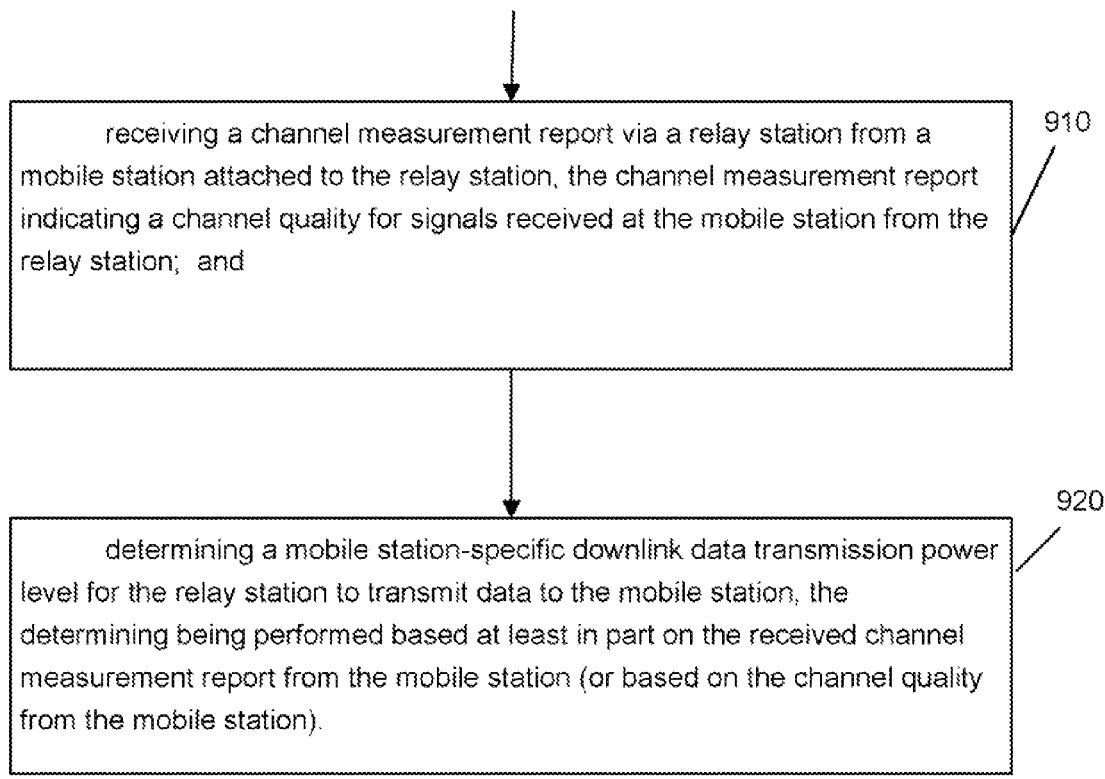
FIG. 9 is a flow chart illustrating operation at a wireless node according to another example embodiment.

FIG. 9 is a flow chart illustrating operation of a wireless node according to another example embodiment. At 910, a channel measurement report may be received via a relay station from a mobile station attached to the relay station, the channel measurement report indicating a channel quality for signals received at the mobile station from the relay station.

At 920, a mobile station-specific downlink data transmission power level may be determined for the relay station to transmit data to the mobile station, the determining being performed based at least in part on the received channel measurement report from the mobile station.

Figure 10:
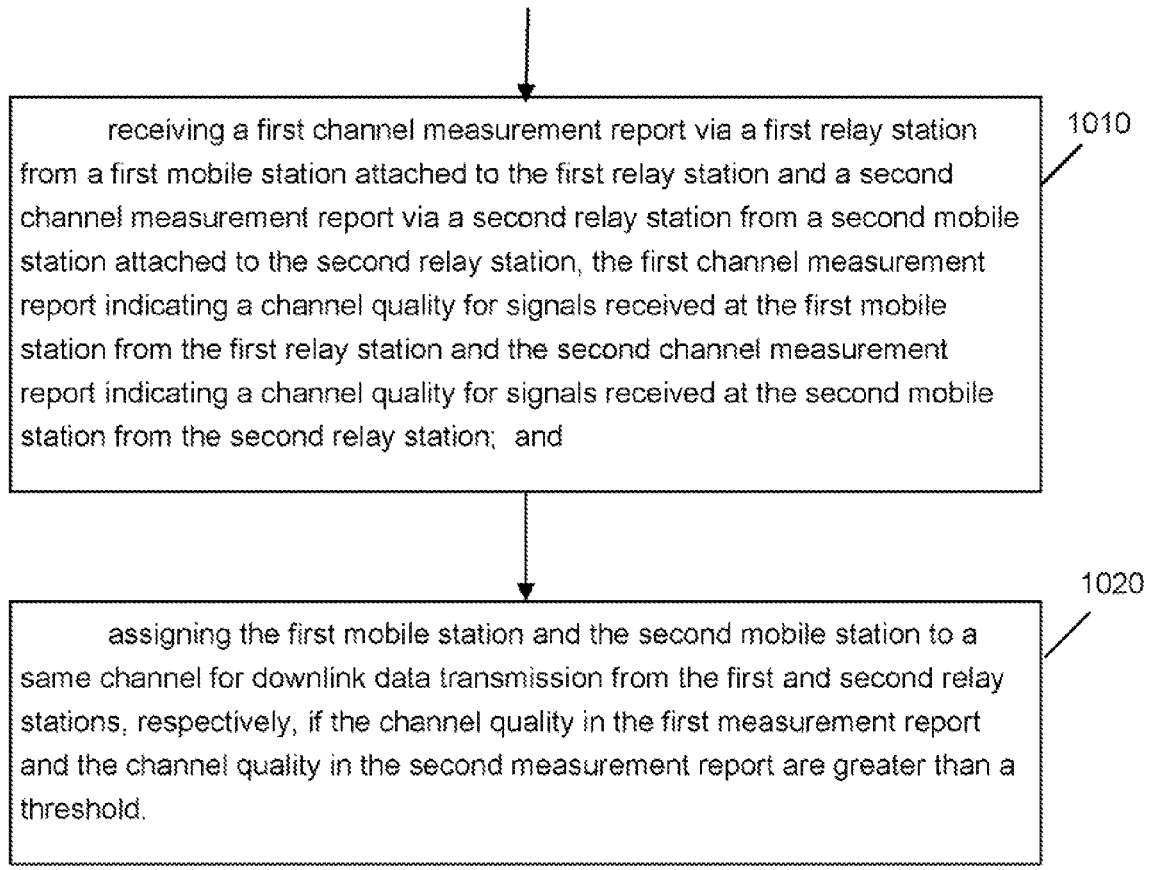
FIG. 10 is a flow chart illustrating operation at a wireless node according to another example embodiment.

FIG. 10 is a flow chart illustrating operation of a wireless node according to another example embodiment. At 1010, a first channel measurement report may be received via a first relay station from a first mobile station attached to the first relay station, and a second channel measurement report may be received via a second relay station from a second mobile station attached to the second relay station. The first channel measurement report may indicate a channel quality for signals received at the first mobile station from the first relay station and the second channel measurement report may indicate a channel quality for signals received at the second mobile station from the second relay station.

At 1020, the first mobile station and the second mobile station may be assigned to a same channel for downlink data transmission from the first and second relay stations, respectively, if the channel quality in the first measurement report (reported from the first mobile station) and the channel quality in the second measurement report (reported from the second mobile station) are greater than a threshold.

Figure 11:
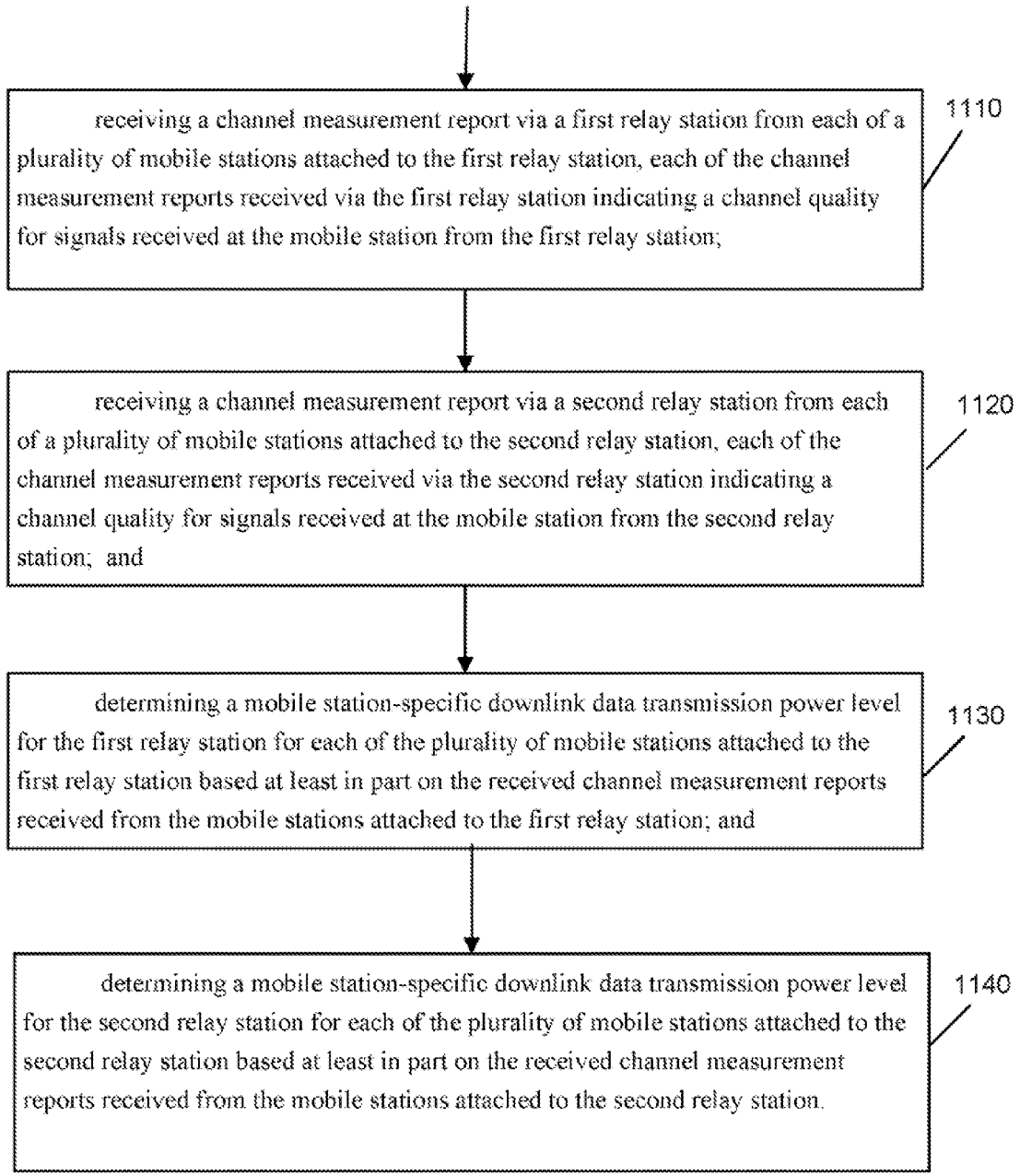
FIG. 11 is a flow chart illustrating operation at a wireless node according to yet another example embodiment.

FIG. 11 is a flow chart illustrating operation of a wireless node according to another example embodiment. At 1110, a channel measurement report may be received via a first relay station from each of a plurality of mobile stations attached to the first relay station, each of the channel measurement reports received via the first relay station indicating a channel quality for signals received at the mobile station from the first relay station.

At 1120, a channel measurement report may be received via a second relay station from each of a plurality of mobile stations attached to the second relay station, each of the channel measurement reports received via the second relay station indicating a channel quality for signals received at the mobile station from the second relay station.

At 1130, a mobile station-specific downlink data transmission power level may be determined for the first relay station for each of the plurality of mobile stations attached to the first relay station based at least in part on the received channel measurement reports received from the mobile stations attached to the first relay station.

At 1140, a mobile station-specific downlink data transmission power level may be determined for the second relay station for each of the plurality of mobile stations attached to the second relay station based at least in part on the received channel measurement reports received from the mobile stations attached to the second relay station.

Figure 12:
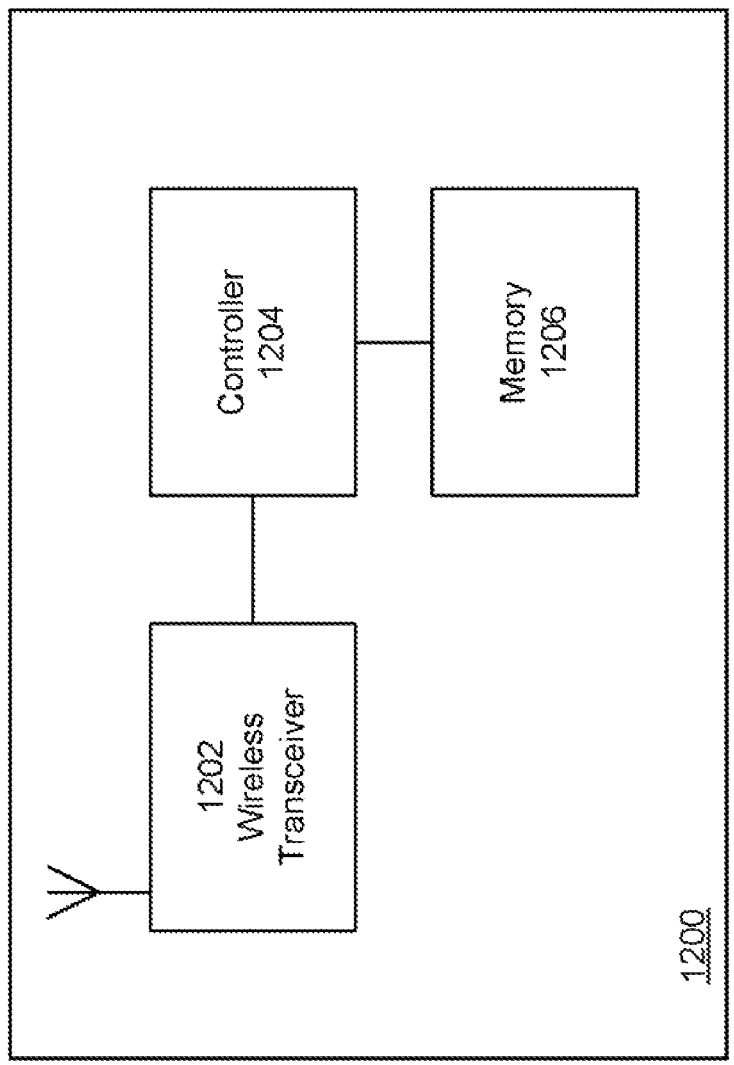
FIG. 12 is a block diagram illustrating an apparatus that may be provided in a wireless node according to an example embodiment.

FIG. 12 is a block diagram illustrating an apparatus 1200 that may be provided in a wireless node according to an example embodiment. The wireless node (e.g. station or AP) may include, for example, a wireless transceiver 1202 to transmit and receive signals, a controller 1204 to control operation of the station and execute instructions or software, and a memory 1206 to store data and/or instructions.

Controller 1204 may be programmable and capable of executing software or other instructions stored in memory or on other computer media to perform the various tasks and functions described above, such as one or more of the tasks, techniques or methods described herein.

In addition, a storage medium may be provided that includes stored instructions, when executed by a controller or processor that may result in the controller 1204, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art.

We claim:

1. A method comprising:
    receiving, by a base station, a neighbor measurement report from at least one relay station in a wireless network, the neighbor measurement report indicating channel quality for signals received at the reporting relay station from at least one neighbor wireless nodes; and
    determining a maximum transmission power level for the at least one relay station based on the received neighbor measurement reports,
    wherein the receiving comprises receiving the neighbor measurement report from a first relay station in the wireless relay network indicating the channel quality for signals received at the first relay station from a second relay station; and
    wherein the determining comprises determining the maximum transmission power level for the second relay station based on the neighbor measurement report from the first relay station.

2. The method of claim 1, further comprising sending a message to each of the one or more relay stations indicating the determined maximum transmission power level for the relay station.

3. The method of claim 1, further comprising sending a RS EIRP-REQ message to the at least one relay station indicating the determined maximum transmission power level for the relay station.

4. The method of claim 1, wherein the neighbor measurement report identifies at least a received signal strength indication, a subcarrier or segment, and a neighbor node identification for each of the one or more neighbor nodes for which channel quality is being reported by the reporting relay station.

5. The method of claim 1, further comprising setting a downlink preamble and control signal power transmission level for the relay station to the determined maximum transmission power level for the relay station.

6. An apparatus for wireless communications, the apparatus comprising:
    a controller;
    a memory coupled to the controller; and
    a wireless transceiver coupled to the controller;
    the apparatus adapted to:
    receive a neighbor measurement report from at least one relay station in a wireless network, the neighbor measurement report indicating channel quality for signals received at the reporting relay station from at least one neighbor wireless nodes; and
    determine a maximum transmission power level for the at least one relay station based on the received neighbor measurement reports,
    wherein the apparatus being adapted to receive comprises the apparatus being adapted to receive the neighbor measurement report from a first relay station in the wireless relay network indicating the channel quality for signals received at the first relay station from a second relay station; and
    wherein the apparatus being adapted to determine comprises the apparatus being adapted to determine the maximum transmission power level for the second relay station based on the neighbor measurement report from the first relay station.

7. A method of power control in a wireless relay network, the method comprising:
receiving a channel measurement report via a relay station from a mobile station attached to the relay station, the channel measurement report indicating a channel quality for signals received at the mobile station from the relay station; and
determining a mobile station-specific downlink data transmission power level for the relay station to transmit data to the mobile station, the determining being performed based at least in part on the received channel measurement report from the mobile station,
wherein the receiving comprises receiving the channel measurement report from a first relay station in the wireless relay network indicating the channel quality for signals received at the first relay station from a second relay station; and
wherein the determining comprises determining the mobile station-specific downlink data transmission power level for the second relay station based on the channel measurement report from the first relay station.

8. The method of claim 7 wherein the receiving comprises receiving the channel measurement report via the relay station from one or more mobile stations attached to the relay station, each channel measurement report indicating a carrier-to-interference-and-noise-ratio (CINR) for signals received at the reporting mobile station from the relay station.

9. The method of claim 7 wherein the determining comprises determining the mobile station-specific downlink data transmission power level for the relay station to transmit data to the mobile station, the determining being performed based at least in part on the received channel measurement report from the mobile station, the mobile station-specific downlink data transmission power level being represented as a boosting value indicating an increase or decrease in transmission power relative to a non-boosted transmission power level.

10. The method of claim 7, further comprising sending a message to the relay station indicating the mobile station-specific determined downlink data transmission power level to be used by the relay station to transmit data to the mobile station.

11. The method of claim 7, further comprising sending a DL-Map message to the relay station indicating the determined mobile station-specific downlink data transmission power level to be used by the relay station for the mobile station, the mobile station-specific downlink data transmission power level being represented in the DL-Map message as a boosting value indicating an increase or decrease in transmission power relative to a non-boosted transmission power level.

12. The method of claim 7, further comprising the relay station transmitting data to the mobile station at the determined mobile station-specific downlink data transmission power level for at least one data burst.

13. The method of claim 7 wherein the determining comprises:
decreasing the mobile station-specific downlink data transmission power level for the mobile station if the channel quality indicated in the channel measurement report from the mobile station is greater than a threshold value.

14. The method of claim 7 wherein the determining comprises:
increasing the mobile station-specific downlink data transmission power level for the mobile station if the channel quality indicated in the channel measurement report from the mobile station is less than a threshold value.

15. The method of claim 7 wherein the determining comprises:
decreasing the mobile station-specific downlink data transmission power level for the mobile station if the channel quality indicated in the channel measurement report from the mobile station is greater than a first threshold value; and
increasing the mobile station-specific downlink data transmission power level for the mobile station if the channel quality indicated in the channel measurement report from the mobile station is less than a second threshold value.

16. The method of claim 7, further comprising:
adjusting a modulation scheme and/or coding scheme used by the relay station for downlink data transmission to the mobile station if the channel quality indicated in the channel measurement report from the mobile station is greater than a threshold value.

17. An apparatus for wireless communications, the apparatus comprising:
a controller;
the apparatus adapted to:
receive a channel measurement report via a relay station from a mobile station attached to the relay station, the channel measurement report indicating a channel quality for signals received at the mobile station from the relay station; and
determine a mobile station-specific downlink data transmission power level for the relay station to transmit data to the mobile station, the determining being performed based at least in part on the received channel measurement report from the mobile station,
wherein the apparatus being adapted to receive comprises the apparatus being adapted to receive the channel measurement report from a first relay station in the wireless relay network indicating the channel quality for signals received at the first relay station from a second relay station; and
wherein the apparatus being adapted to determine comprises the apparatus being adapted to determine the mobile station-specific downlink data transmission power level for the second relay station based on the channel measurement report from the first relay station.

18. A method of power control in a wireless relay network, the method comprising:
receiving a first channel measurement report via a first relay station from a first mobile station attached to the first relay station and a second channel measurement report via a second relay station from a second mobile station attached to the second relay station, the first channel measurement report indicating a channel quality for signals received at the first mobile station from the first relay station and the second channel measurement report indicating a channel quality for signals received at the second mobile station from the second relay station; and
assigning the first mobile station and the second mobile station to a same channel for downlink data transmission from the first and second relay stations, respectively, if the channel quality in the first measurement report and the channel quality in the second measurement report are greater than a threshold.

19. The method of claim 18 wherein the channel quality comprises a carrier-to-interference-and-noise-ratio.

* * * * *